Patented Oct. 25, 1938

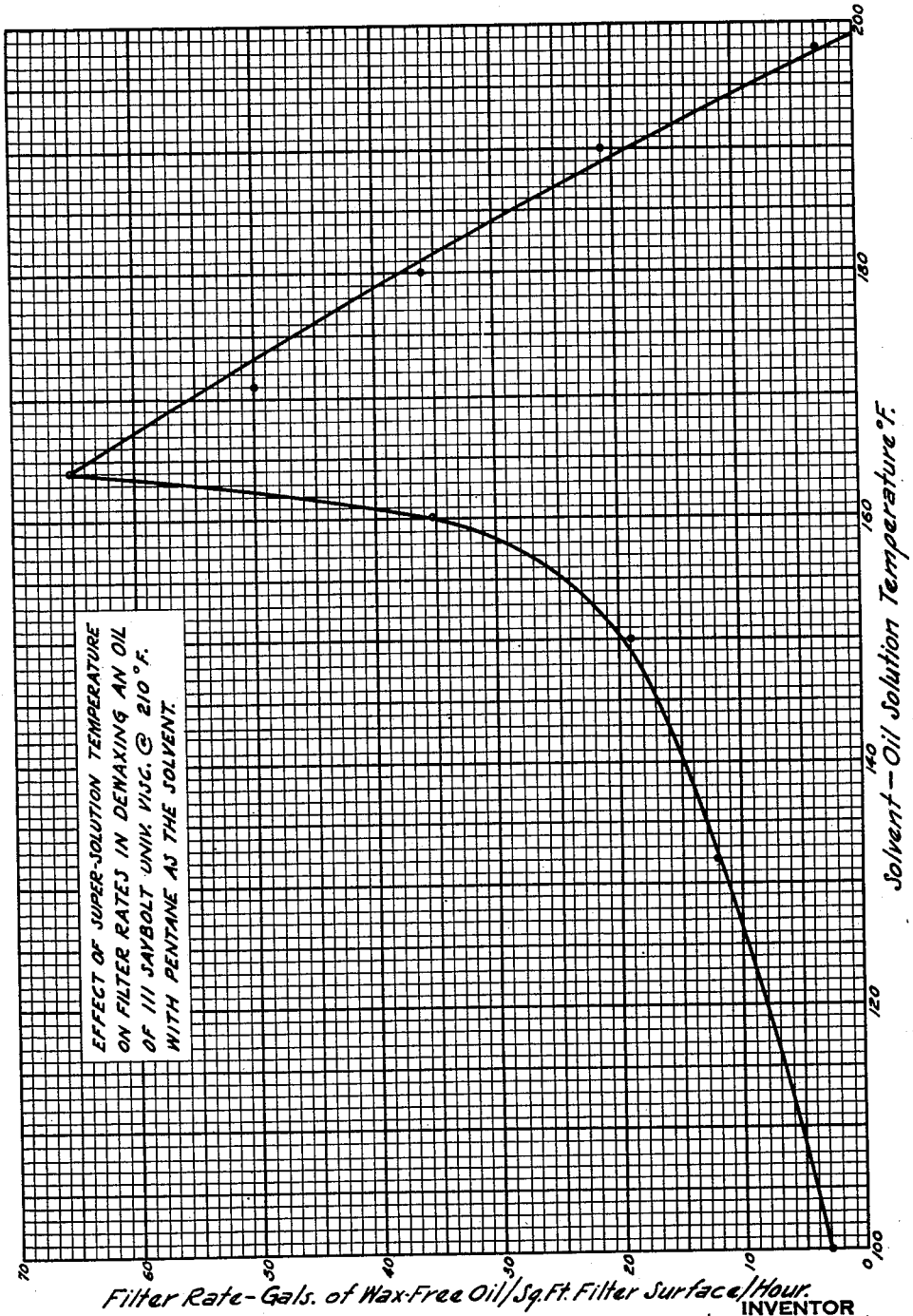

2,134,337

UNITED STATES PATENT OFFICE 2,134,337

DEWAXING MINERAL OIL

Edwin C. Knowles, Beacon, N. Y., assignor to The Texas Company, New York, N. Y., a corporation of Delaware Application November 18, 1935, Serial No. 50,409

4 Claims. (Cl. 196—18)

This invention relates to the separation of wax from oil.

The invention contemplates a process of dewaxing wax-bearing mineral oil containing either a naturally occurring or an added wax crystal modifying substance, wherein the oil is mixed with a solvent liquid, the resulting mixture of oil heated to an elevated temperature, and the heated mixture thereafter chilled to precipitate the wax constituents which are subsequently removed.

The present application is a continuation-in-part of my pending application, Serial No. 41,393, for Dewaxing mineral oil, filed September 20, 1935.

The present invention concerns dewaxing with solvents comprising light petroleum fractions. The solvent thus contemplated may comprise naphtha or fractions comprising hydrocarbons, such as propane, butane, pentane, and the like, up to nonane, or mixtures of such hydrocarbons.

More specifically, my invention comprises mixing the wax-bearing oil containing wax crystal modifying material with a diluent comprising, for example, pentane, and then heating this mixture to a temperature of around 40° to 90° F. above the minimum temperature of apparent complete solution of the wax and oil in the solvent, and while under sufficient pressure to maintain the diluent in a liquid condition. This mixture is then chilled to a temperature of from 0° to —30° or —40° below zero, in order to precipitate the wax constituents which may then be removed by filtration.

In my above mentioned pending application, I have disclosed a novel process of dewaxing oil which comprises mixing wax-bearing oil with a selective solvent of the character of a mixture consisting of 35% acetone and 65% benzol and heating the mixture to a temperature in the range of 125° to 175° prior to chilling. Thereafter, the heated mixture is chilled to temperatures of 0° F. and below in order to precipitate the wax. The wax constituents thus precipitated are removed by mechanical means, such as filtration.

I have found that heating the mixture of wax-bearing oil and solvent to a temperature sufficiently elevated above the minimum temperature of apparent complete solution of wax and oil in the solvent exerts a beneficial effect upon the crystalline structure of the wax precipitated so that the wax is more readily separated from the mixture and can be more rapidly filtered therefrom. As a consequence, the filter rates may be increased very greatly over the rate obtaining in the ordinary dewaxing procedure where the mixture of oil and solvent is not subjected to the specific heating step of my invention.

The filter cake obtained by the practice of my invention is less voluminous, retains less oil, and comprises a higher content of paraffin wax. Furthermore, there is an increase in the yield of wax-free oil obtained as a result of following the procedure of my invention.

It is thought that wax-bearing oils having a Saybolt Universal viscosity of above 80 seconds at 210° F. contain naturally-occurring asphaltic constituents of a resinous character which partake of the nature of a wax crystal modifying substance under certain conditions. These constituents are believed to be less soluble than wax in the dewaxing solvent liquid, and at the minimum temperature at which the wax-bearing oil appears to be in complete solution these constituents are not in true solution but rather are present as a colloidal solution.

In this form, these constituents possibly form films on the small plate-type paraffin crystals formed during preliminary precipitation of wax from the solution, and these films inhibit the normal transformation of the plate-type wax crystals into the more easily filterable type of crystals.

It is believed that upon heating the mixture of oil and solvent, as above disclosed, these colloidal or low solubility substances are completely dissolved in the solvent. Upon chilling the thus heated solution, these constituents precipitate from the solution substantially co-extensively with the wax in the form of nuclear particles which facilitate crystallization of wax in a more readily separable and filterable form. It is thought that the optimum effect is realized when the modifying substance continues to precipitate from the solution over the entire range of wax crystallization.

Wax-bearing oils of relatively less viscosity as, for example, up to about 75 Saybolt Universal seconds at 210° F. appear to be deficient in the above mentioned resinous constituents and, accordingly, I have found it advantageous, in the case of such oils, to use a small amount of an added wax crystal modifying material. Such material may comprise small amounts of montan wax, aluminum stearate, or mixtures thereof, or synthetic modifying substances, such as derived by condensation of chlorinated wax and naphthalene. The amounts of such material added may be of the order of about 0.1 to 1% by weight of the wax-bearing oil.

I have found that when dewaxing these relatively low viscosity oils in the presence of an added material of this character, the resulting filtration rate and yield of wax-free oil is very greatly improved by subjecting the mixture containing the added material to the preliminary heating step of my invention.

The minimum temperature of apparent complete solution of wax-bearing oil in the petroleum hydrocarbon type of solvent herein contemplated may range from 100° to about 140° F., depending upon the nature and viscosity of the oil and also upon the character of the solvent.

I have found that improved results are obtained with a petroleum hydrocarbon solvent by heating the mixture of oil and such solvent to temperatures of from about 40° to 90° F. above the minimum temperature of apparent complete solution. The highest filter rates appear to be realized over a comparatively narrow portion of this temperature range, the critical range being about 15 degrees.

For example, by the process of my invention, where a wax-bearing oil having a Saybolt Universal viscosity of 80 seconds and above at 210° F. is diluted with a solvent comprising pentane, I contemplate heating the dilute mixture to a temperature in the range of about 140° to 190°, and preferably around 165° F., prior to chilling.

In order to illustrate the invention, reference will now be made to the accompanying drawing. The curve shown in this drawing represents the relation between the filtration rate and the temperature to which the mixture of oil and solvent was heated prior to chilling. The oil used in this instance comprised a wax-bearing distillate fraction previously refined with a solvent and derived from a Mid-Continent crude. This oil had a viscosity of 111 to 112 Saybolt Universal seconds at 210° F. It was mixed with pentane in the proportion of one part of oil to four parts of pentane.

Separate samples of this mixture were then heated to successively higher temperatures while under pressure sufficient to maintain the pentane in a liquefied condition.

Each sample was then separately chilled to a temperature of from −15° to −18° F. and filtered at that temperature.

The dewaxing apparatus used was similar to that described in my above mentioned pending application. During the chilling step, the mixture was subjected to relatively mild agitation by bubbling an inert gas through the mixture in the manner disclosed in the above mentioned application.

The curve shown in the accompanying drawing represents the results obtained by filtering each one of these samples. As shown by this curve, as the temperature of preliminary heating varied over the range from 100° F. (the minimum temperature of apparent complete solution) to about 150° F., the increase in filter rate measured in gallons of wax-free oil per square foot of filtering surface per hour increased gradually. Over the range from 150° to about 164° F., the filtration rate increased quite rapidly, and then at temperatures above 164° F. the filter rate dropped off quite rapidly. At 190° F., the rate had decreased considerably although still higher than the rate at the minimum solution temperature.

It is thought that at low solution temperatures from 100° to 150° F., the naturally-occurring resinous material contained in the oil was probably not in complete solution. On the other hand, in the temperature range 150° to 165° F., this material was in true solution rather than in colloidal solution, and thus served most efficiently as a wax crystal modifying material with the result that the wax was precipitated from the solution in a more readily filterable form.

As shown in the drawing, when a temperature of about 158° F. is reached, the curve begins to rise almost vertically, reaching a maximum at about 164° F. and then falling off sharply. According to the curve, heating the mixture of wax-bearing oil and pentane to a temperature in the range 158° to 184° F. prior to chilling results in a filtration rate of not less than 30 gallons of wax-free oil per square foot of filtering surface per hour, the maximum rate of about 65 gallons being realized with a heating temperature of 164° F.

At temperatures above 165° F., it is thought that possibly a de-resinifying phenomenon occurred somewhat analogous to that occurring when asphaltic constituents are purposely precipitated, as in the case of de-asphaltizing operations.

The following tabulation affords a comparison of the filter rate, pour test and yields of wax-free oil and paraffin when heating mixtures of the above viscous oil and pentane to temperatures of 132° F. and 164° F., respectively, prior to chilling and filtering:

|  | Heating temperature | |
| --- | --- | --- |
|  | 132° F. | 164° F. |
| Filter rate | 12.0 | 65 |
| Dewaxing temperature | −15° F. | −18° F. |
| Pour test | +20° F. | +20° F. |
| Percent yield of wax-free oil | 87 | 90.5 |
| Percent paraffin in slack wax | 77 | 83 |

The yields of wax-free oil shown above represent gallons of wax-free oil per square foot of filtering surface per hour, calculated on the basis of time required for the passage of equal volumes of wax-free oil through the filter surface; namely, 0.2 gallon per square foot of filtering surface. These yields represent the amount of wax-free oil obtained without subjecting the filter cake to a solvent wash.

As indicated, the filter rate obtaining when heating the mixture to a temperature of only 132° F. was 12 gallons, as compared with a filter rate of 65 gallons when heating the mixture to a temperature of 164° F. prior to chilling. Also, as indicated, a higher yield of wax-free oil was obtained by the higher preliminary heating, and likewise a corresponding increase in the yield of paraffin in the slack wax.

While the dewaxing of a relatively viscous oil has been described above, it is contemplated that the invention is applicable to dewaxing relatively less viscous oils as, for example, wax distillates having a viscosity up to about 75 Saybolt Universal seconds at 210° F., and to which have been added a small amount of wax crystal modifying material.

The modifying substance, such as aluminum stearate, for example, may be added to the oil, or to the mixture of oil and diluent. It may, if desired, be incorporated therein in the form of a gel made by mixing a small amount of the soap with a portion of relatively low viscosity oil while under the influence of heat.

It is also contemplated that the process is applicable to dewaxing with the above petroleum diluents in the presence of an anti-solvent liquid of the character of acetone and methyl ethyl ketone, for example. In that case, the wax-bearing oil containing the wax crystal modifying material may be mixed with a solvent liquid comprising about 20% to 40% anti-solvent liquid, and 80% to 60% light petroleum hydrocarbon.

Obviously, many modifications and variations of the invention, as hereinbefore set forth, may be made without departing from the spirit and scope thereof, and therefore only such limitations should be imposed as are indicated in the appended claims.

I claim:

1. The method of dewaxing wax-bearing mineral lubricating oil which comprises diluting the oil containing wax crystal modifying material with a solvent comprising mainly pentane, heating the mixture to a temperature in the range of 158° to 184° F., chilling the heated mixture to a temperature of the order of 0° F. and below to precipitate wax constituents therefrom, removing the wax constituents thus precipitated, and removing the solvent from the dewaxed oil.

2. The method of dewaxing a viscous wax-bearing mineral lubricating oil which comprises mixing the oil containing a naturally occurring wax crystal modifying material with a low-boiling petroleum hydrocarbon solvent of such character and in such proportion with the oil that the wax and oil are dissolved in the solvent at a temperature of not in excess of about 150° F., heating the mixture to a temperature substantially above 150° F. and not substantially in excess of about 165° F. such that upon chilling the thus heated mixture to around 0° F. and filtering out the precipitated wax, the rate of filtration is unexpectedly greater than that secured where the mixture is heated only to the aforesaid minimum solution temperature, the rate of change in filtration with respect to heating temperature in the elevated range being rapid as compared with the gradual change in rate for heating temperatures in the minimum solution temperature range, chilling the thus heated mixture to around 0° F. and below, and filtering out the wax thus precipitated.

3. The method of dewaxing a wax-bearing mineral lubricating oil which comprises mixing the oil containing a wax crystal modifying material with a low-boiling normally liquid petroleum hydrocarbon solvent in which the wax and oil appear to be completely dissolved at a temperature not greater than about 150° F., heating the mixture to a temperature substantially above 150° F. and not substantially in excess of 165° F. such that upon chilling the mixture and filtering the chilled mixture to remove the precipitated wax the rate of filtration is unexpectedly greater than, being more than double, that secured by heating only to about 150° F., chilling the thus heated mixture to around 0° F. and below to precipitate wax, and filtering out the wax thus precipitated.

4. The method of dewaxing a wax-bearing mineral lubricating oil which comprises mixing the oil containing a wax crystal modifying material with a low-boiling normally liquid petroleum hydrocarbon solvent in which the wax and oil appear to be completely dissolved at a temperature not greater than about 150° F., heating the mixture to a temperature around 165° F. such that upon chilling the mixture and filtering the chilled mixture to remove the precipitated wax the rate of filtration is unexpectedly greater than that secured by heating only to around 150° F., chilling the thus heated mixture to around 0° F. and below to precipitate wax, and filtering out the wax thus precipitated.

EDWIN C. KNOWLES.